US006221303B1

(12) United States Patent
Steinmann

(10) Patent No.: US 6,221,303 B1
(45) Date of Patent: Apr. 24, 2001

(54) OPHTHALMIC MOULDINGS

(75) Inventor: Bettina Steinmann, Praroman-Le Mouret (CH)

(73) Assignee: Novartis AG, Basel (CH)

(*) Notice: Subject to any disclaimer, the term of this patent is extended or adjusted under 35 U.S.C. 154(b) by 0 days.

(21) Appl. No.: 09/367,275

(22) PCT Filed: Feb. 19, 1998

(86) PCT No.: PCT/EP98/00961

§ 371 Date: Aug. 12, 1999

§ 102(e) Date: Aug. 12, 1999

(87) PCT Pub. No.: WO98/37441

PCT Pub. Date: Aug. 27, 1998

(30) Foreign Application Priority Data

Feb. 21, 1997 (EP) .................................. 97810087

(51) Int. Cl.[7] .............................. B29C 35/08; G02C 7/04; G02C 7/02; C08F 120/36; C08F 26/00
(52) U.S. Cl. ...................... 264/496; 351/159; 351/160 R; 522/84; 522/96; 522/97; 522/173; 526/312; 528/59
(58) Field of Search ............................. 264/496; 522/173, 522/96, 97, 84, 312; 526/106; 523/159; 351/160 R; 528/59

(56) References Cited

U.S. PATENT DOCUMENTS

| 4,246,379 | 1/1981 | Howard | 525/440 |
|---|---|---|---|
| 5,470,689 | 11/1995 | Wolf et al. | 430/269 |

FOREIGN PATENT DOCUMENTS

| 0 291 452 A2 | 4/1988 | (EP) . |
| 0 406 161 A2 | 6/1990 | (EP) . |
| 0 537 877 A2 * | 4/1993 | (EP) . |
| 0 614 122 A1 | 2/1994 | (EP) . |
| WO 96/24073 | 1/1996 | (WO) . |

OTHER PUBLICATIONS

Studies on Vinyl Ester Resin and Its Urethane Derivative as Coating Materials, R. R. Pachha, et al., Applied Macromolecular Chemistry and Physics, (1994) Jan., pp. 211–216.

* cited by examiner

*Primary Examiner*—Susan W. Berman
(74) *Attorney, Agent, or Firm*—R. Scott Meece; Robert J. Gorman, Jr.

(57) ABSTRACT

The invention relates to ophthalmic mouldings, especially contact lenses, obtainable by cross-linking a prepolymer that corresponds essentially to formula (1) wherein the variables are as defined in the claims, in the absence or presence of an additional vinyl comonomer.

24 Claims, No Drawings

OPHTHALMIC MOULDINGS

The present invention relates to novel polyoxyalkylene-unit-containing block copolymers having a number of crosslinkable side groups, to a process for the preparation thereof, and to the use thereof in the production of mouldings, especially opthalmic mouldings, such as contact lenses.

A tetraacrylate that is obtained by reacting a polypropylene glycol diglycidyl diacrylate with a diisocyanate and a hydroxyethyl acrylate, and the use thereof as a formulation component in resin mixtures for stereolithographic processes, is already known from EP-A-0 614 122.

It has now surprisingly been found that specific crosslinkable polyether copolymers are especially suitable for the production of ophthalmic mouldings, such as, for example, contact lenses.

The present invention relates to ophthalmic mouldings obtainable by crosslinking a prepolymer that corresponds essentially to formula

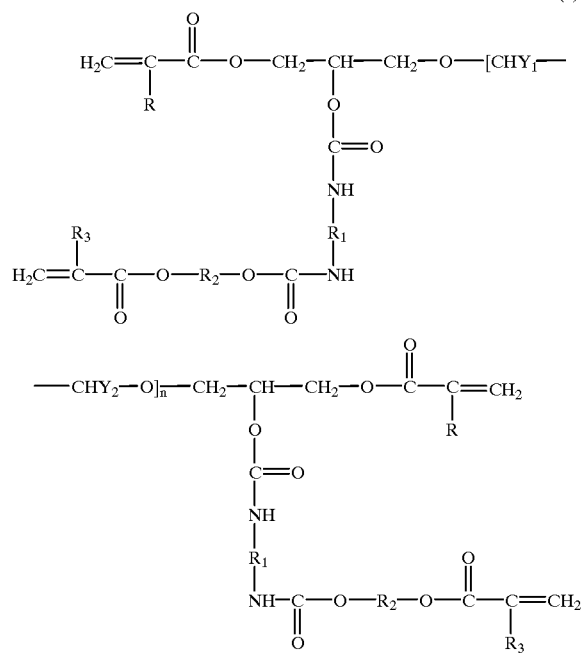

(1)

wherein
R and $R_3$ are each independently of the other hydrogen or methyl, one of the radicals $Y_1$ and $Y_2$ is hydrogen and the other is hydrogen or methyl,
$R_1$ is the radical of a linear or branched aliphatic diisocyanate having from 3 to 24 carbon atoms, the radical of a cycloaliphatic or aliphatic-cycloaliphatic diisocyanate having from 3 to 24 carbon atoms, or the radical of an aromatic or araliphatic diisocyanate having from 6 to 24 carbon atoms,
$R_2$ is $C_1$–$C_{12}$alkylene or a radical of formula

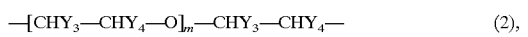

(2), wherein one of the radicals $Y_3$ and $Y_4$ is hydrogen and the other is hydrogen or methyl,
m is an integer from 4 to 99 and
n is an integer from 5 to 100,
in the absence or presence of an additional vinyl comonomer.

In formula (1) R is, for example, methyl or, preferably, hydrogen. The variable $R_3$ is, for example, hydrogen or, preferably, methyl.

A variant of the prepolymers used in accordance with the invention concerns those in which one of $Y_1$ and $Y_2$ is hydrogen and the other is methyl. A further preferred variant of the prepolymers used in accordance with the invention concerns those in which $Y_1$ and $Y_2$ are each hydrogen. The variable n is, for example, an integer from 5 to 100, especially from 8 to 50 and more especially from 9 to 25.

$R_1$ is preferably linear or branched $C_3$–$C_{18}$alkylene or unsubstituted or $C_1$–$C_4$alkyl- or $C_1$–$C_4$-alkoxy-substituted $C_6$–$C_{10}$arylene, C–$C_{18}$aralkylene, $C_6$–$C_{10}$arylene-$C_1$–$C_2$alkylene-$C_6$–$C_{10}$-arylene, $C_3$–$C_8$cycloalkylene, $C_3$–$C_8$cycloalkylene-$C_1$–$C_6$alkylene, $C_3$–$C_8$cycloalkylene-$C_1$–$C_2$-alkylene-$C_3$–$C_8$cycloalkylene or $C_1$–$C_6$alkylene-$C_3$–$C_8$cycloalkylene-$C_1$–$C_6$alkylene.

$R_1$ as alkylene is preferably a linear or branched $C_3$–$C_{18}$ alkylene radical, especially a linear or branched $C_4$–$C_{12}$ alkylene radical and more especially a linear, or especially a branched, $C_6$–$C_{12}$alkylene radical. Preferred alkylene radicals include 1,4-butylene, 2,2-dimethyl-1,4-butylene, 1,5-pentylene, 2,2-dimethyl-1,5-pentylene, 1,6-hexylene, 2,2,3- or 2,2,4-trimethyl-1,5-pentylene, 2,2-dimethyl-1,6-hexylene, 2,2,3- or 2,2,4- or 2,2,5-trimethyl-1,6-hexylene, 2,2-dimethyl-1,7-heptylene, 2,2,3- or 2,2,4- or 2,2,5- or 2,2,6-trimethyl-1,7-heptylene, 2,2-dimethyl-1,8-octylene, and 2,2,3- or 2,2,4- or 2,2,5- or 2,2,6- or 2,2,7-trimethyl-1,8-octylene.

When $R_1$ is arylene it is especially naphthylene or more especially phenylene. When the arylene is substituted, a substituent is preferably located in the ortho position to an isocyanate group. Examples of substituted arylene are 1-methyl-2,4-phenylene, 1,5-dimethyl-2,4-phenylene, 1-methoxy-2,4-phenylene and 1-methyl-2,7-naphthylene.

$R_1$ as aralkylene is especially naphthylalkylene or more especially phenylalkylene. The alkylene group in the aralkylene contains preferably from 1 to 12, especially from 1 to 6, or more especially from 1 to 4 carbon atoms. More especially, the alkylene group in the aralkylene is methylene or ethylene. Examples include 1,3- or 1,4-benzylene, naphth-2-yl-7-methylene, 6-methyl-1,3- or 1,4-benzylene, and 6-methoxy-1,3- or -1,4-benzylene.

When $R_1$ is cycloalkylene it is especially $C_5$–$C_6$cycloalkylene or more especially cyclohexylene, each of which is unsubstituted or substituted by methyl. Examples include 1,3-cyclobutylene, 1,3-cyclopentylene, 1,3- or 1,4-cyclohexylene, 1,3- or 1,4-cycloheptylene, 1,3- or 1,4- or 1,5-cyclooctylene, 4-methyl-1,3-cyclopentylene, 4-methyl-1,3-cyclohexylene, 4,4-dimethyl-1,3-cyclohexylene, 3-methyl- or 3,3-dimethyl-1,4-cyclohexylene, 3,5-dimethyl-1,3-cyclohexylene and 2,4-dimethyl-1,4-cyclohexylene.

When $R_1$ is cycloalkylenealkylene it is preferably cyclopentylene-$C_1$–$C_4$alkylene or especially cyclohexylene-$C_1$–$C_4$alkylene, each of which is unsubstituted or mono- or poly-substituted by $C_1$–$C_4$alkyl, especially methyl. The group cycloalkylenealkylene is more especially cyclohexyleneethylene or preferably cyclohexylenemethylene, each of which is unsubstituted or substituted in the cyclohexylene radical by from 1 to 3 methyl groups. Examples include cyclopent-1-yl-3-methylene, 3-methylcyclopent-1-yl-3-methylene, 3,4-dimethylcyclopent-1-yl-3-methylene, 3,4,4-trimethylcyclopent-1-yl-3-methylene, cyclohex-1-yl-3- or -4-methylene, 3- or 4- or 5-methylcyclohex-1-yl-3- or -4-methylene, 3,4- or 3,5-dimethylcyclohex-1-yl-3- or 4-methylene, and 3,4,5- or 3,4,4- or 3,5,5-trimethylcyclohex-1-yl-3- or -4-methylene.

When $R_1$ is alkylenecycloalkylenealkylene it is preferably $C_1$–$C_4$alkylenecyclopentylene-$C_1$–$C_4$alkylene or especially $C_1$–$C_4$alkylenecyclohexylene-$C_1$–$C_4$alkylene, each of which is unsubstituted or mono- or poly-substituted by $C_1$–$C_4$alkyl, especially methyl. The alkylenecycloalkylene-alkylene group is more especially ethylenecyclohexylene-ethylene or preferably methylenecyclohexylenemethylene, each of which is unsubstituted or substituted in the cyclohexylene radical by from 1 to 3 methyl groups. Examples include cyclopentane-1,3-dimethylene, 3-methylcyclopentane-1,3-dimethylene, 3,4-dimethylcyclopentane-1,3-dimethylene, 3,4,4-trimethylcyclopentane-1,3-dimethylene, cyclohexane-1,3- or -1,4-dimethylene, 3- or 4- or 5-methylcyclohexane-1,3- or -1,4-dimethylene, 3,4- or 3,5-dimethylcyclohexane-1,3- or -1,4-dimethylene, and 3,4,5- or 3,4,4- or 3,5,5-trimethylcyclohexane-1,3- or -1,4-dimethylene.

$R_1$ as $C_3$–$C_8$cycloalkylene-$C_1$–$C_2$alkylene-$C_3$–$C_8$cycloalkylene or $C_6$–$C_{10}$arylene-$C_1$–$C_2$alkylene-$C_6$–$C_{10}$arylene is preferably $C_5$–$C_6$cycloalkylenemethylene-$C_5$–$C_6$cycloalkylene or phenylene-methylenephenylene, each of which may be unsubstituted or substituted in the cycloalkyl or phenyl ring by one or more methyl groups.

The radical $R_1$ is of symmetrical or, preferably, asymmetrical structure.

In a preferred group of $R_1$ radicals, $R_1$ is linear or branched $C_6$–$C_{10}$alkylene, cyclohexylenemethylene or cyclohexylenemethylenecyclohexylene unsubstituted or substituted in the cyclohexyl moiety by from 1 to 3 methyl groups, or phenylene or phenylenemethylenephenylene unsubstituted or substituted in the phenyl moiety by methyl.

Examples of suitable radicals $R_1$ are the radicals of methylene bis(phenylisocyanate), hexamethylene diisocyanate (HMDI), methylene bis(cyclohexylisocyanate), isophorone diisocyanate (IPDI), toluylene-2,4-diisocyanate (TDI) and of 1,6-diisocyanato-2,2,4-trimethyl-n-hexane (TMDI).

In an especially preferred group of $R_1$ radicals, $R_1$ is linear or branched $C_6$–$C_{10}$alkylene, or cyclohexylenemethylene or cyclohexylenemethylenecyclohexylene unsubstituted or substituted in the cyclohexyl moiety by from 1 to 3 methyl groups. $R_1$ is more especially asymmetrical, branched $C_6$–$C_{10}$alkylene, or cyclohexylenemethylene substituted in the cyclohexyl moiety by from 1 to 3 methyl groups.

When $R_2$ is an alkylene radical it is, for example, straight-chain or branched $C_1$–$C_{12}$alkylene. $R_2$ as an alkylene radical is especially $C_1$–$C_6$alkylene or more especially $C_2$–$C_4$alkylene. Examples of especially preferred alkylene radicals $R_2$ are 1,3-propylene and, especially, 1,2-ethylene.

When $R_2$ is a radical of the above formula (2), which is preferred, m is, for example, an integer from 4 to 99, especially from 7 to 49, or more especially from 8 to 24.

A variant of the prepolymers used in accordance with the invention concerns those prepolymers in which $R_2$ is a radical of the above formula (2) and one of the radicals $Y_3$ and $Y_4$ is hydrogen and the other is methyl.

A further preferred variant of the prepolymers used in accordance with the invention concerns those prepolymers in which $R_2$ is a radical of the above formula (2) and $Y_3$ and $Y_4$ are each hydrogen.

A preferred embodiment of the prepolymers used in accordance with the invention concerns those prepolymers that correspond essentially to formula

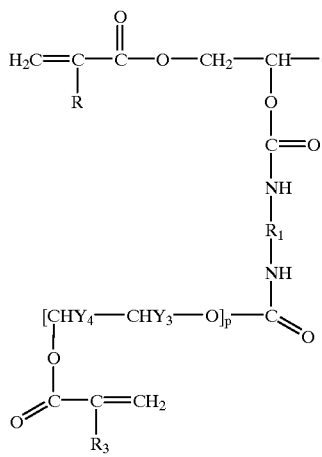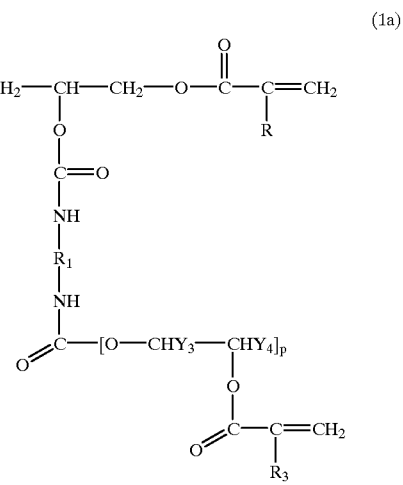

(1a)

each of which may be unsubstituted or substituted in the cycloalkyl or phenyl ring by one or more methyl groups.

wherein R, $R_1$, $R_3$, $Y_1$, $Y_2$, $Y_3$, $Y_4$ and n each have the meanings and preferred meanings given above and p is an integer from 5 to 100, especially from 8 to 50, or more especially from 9 to 25.

Special preference is given to prepolymers that correspond essentially to formula (1a) above wherein R and $R_3$ are each independently of the other hydrogen or methyl, $R_1$ is linear or branched $C_6$–$C_{10}$alkylene, cyclohexylenemethylene or cyclohexylenemethylenecyclohexylene unsubstituted or substituted in the cyclohexyl moiety by from 1 to 3 methyl groups, or phenylene or phenylenemethylenephenylene unsubstituted or substituted in the phenyl moiety by methyl, $Y_1$, $Y_2$, $Y_3$ and $Y_4$ are each hydrogen, and n and p are each independently of the other an integer from 8 to 50.

Special preference is given to prepolymers that correspond essentially to formula (1a) above wherein R and $R_3$ are each independently of the other hydrogen or methyl, $R_1$ is asymmetrical, branched $C_6$–$C_{10}$alkylene, or cyclohexylenemethylene substituted in the cyclohexyl moiety by from 1 to 3 methyl groups, $Y_1$, $Y_2$, $Y_3$ and $Y_4$ are each hydrogen, and n and p are each independently of the other an integer from 9 to 25.

As has already been mentioned, the opthhalmic mouldings according to the invention may be obtained by crosslinking a prepolymer of formula (1) in the presence or absence of an additional vinyl comonomer. It is furthermore possible also for mixtures of two or more different prepolymers of the above formulae (1) and/or (1a) to be used as starting material in the production of the ophthalmic mouldings according to the invention.

The prepolymers of the above formula (1a), in which the meanings and preferred meanings given above apply to each of the variables therein, are novel and the invention relates also thereto.

The prepolymers according to the invention may be prepared, for example, by reacting approximately 1 molar equivalent of a compound of formula

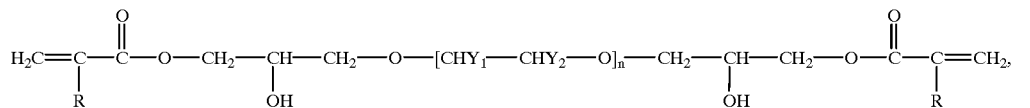

wherein $R$, $Y_1$, $Y_2$ and n are each as defined hereinbefore, with approximately 2 molar equivalents of a duisocyanate of formula

wherein $R_1$ is as defined hereinbefore, and then reacting the addition product of formula

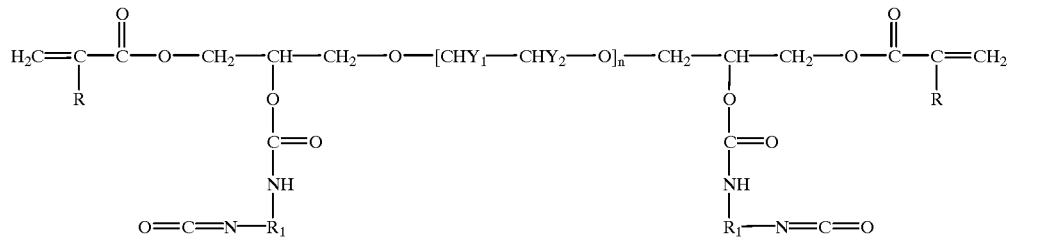

obtainable in that reaction with approximately 2 molar equivalents of a compound of formula

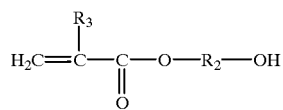

wherein $R_2$ and $R_3$ are each as defined hereinbefore, to form a prepolymer of formula (1) according to the invention.

All of the compounds of formulae (3), (4) and (6) are known or may be obtained in a manner known per se. The compounds of formula (3) may be prepared, for example, by reacting a polyalkylene glycol diglycidyl ether with acrylic acid or methacrylic acid in a molar ratio of approximately 1:2. The compounds of formula (6) can be obtained, for example, by reacting a reactive acrylic or methacrylic acid derivative, for example the corresponding acid chloride, with equimolar amounts of a diol or polyalkylene glycol of the formula HO-$R_2$-OH.

The reaction of the diglycidyl ether of formula (3) with the diisocyanate of formula (4) (1st reaction step) and the further reaction of the addition product of formula (5) with the hydroxy(meth)acrylate of formula (6) (2nd reaction step) are each advantageously carried out in an inert solvent. Suitable inert solvents are aprotic solvents, such as, for example, aliphatic or aromatic hydrocarbons, for example a higher-boiling alkane or alkane mixture, such as petroleum ether, a xylene mixture or toluene; halogenated hydrocarbons, for example chloroform, methylene chloride, trichloroethane, tetrachloroethane, chlorobenzene; ethers, for example tetrahydrofuran, dioxane; ketones, for example acetone, ethyl methyl ketone, dibutyl ketone, methyl isobutyl ketone; carboxylic acid esters and lactones, for example ethyl acetate, butyrolactone, valerolactone; alkylated carboxylic acid amides, for example N,N-dimethylacetamide, N-methylpyrrolidone; nitrites, for example acetonitrile; sulfones and sulfoxides, for example dimethyl sulfoxide, tetramethylenesulfone. Mixtures of several of the mentioned solvents are also possible.

The reaction temperature in both the first reaction step and the second reaction step is, for example, from −5° C. to 150° C., especially from 0 to 100° C., more especially from 20 to 80° C. It is furthermore preferable for both the reaction of the hydroxy group-containing component of formula (3) with the diisocyanate of formula (4) and the reaction of the addition product of formula (5) with the hydroxy compound of formula (6) to be carried out in the presence of a catalyst. Suitable catalysts include, for example, metal salts, such as alkali metal salts or tin salts of organic carboxylic acids or tertiary amines, for example $(C_1-C_6alkyl)_3N$ (triethylamine, tri-n-butylamine), N-methylpyrrolidine, N-methyimorpholine, N,N-dimethylpiperidine, pyridine and 1,4-diazabicyclooctane. Tin salts have proved particularly effective, especially alkyltin salts of carboxylic acids, such as, for example, dibutyltin dilaurate and tin dioctoate.

The catalyst is used in the reaction in a ratio by weight of, for example, from 1:10 to 1:1000, especially from 1:50 to 1:750, or more especially approximately from 1:100 to 1:500, based in each case on the component of formula (3) or (5).

The reaction times may vary within wide limits, it being possible for the progress of the reaction to be monitored satisfactorily by means of the decrease in the isocyanate content of the reaction mixture. Reaction times that have proved practicable are, for example, in the 1st reaction step of the reaction of the compound of formula (3) with the diisocyanate of formula (4), from 0.5 to 12 hours or preferably from 1 to 5 hours and, in the 2nd reaction step of the reaction of the compound of formula (5) with the compound of formula (6), from 1 to 24 hours or preferably from 4 to 16 hours.

The reaction is advantageously carried out in a one-pot process, for example by reacting the compound of formula (3) with the diisocyanate of formula (4) until the isocyanate content of the reaction mixture has halved, then adding a compound of formula (6), where appropriate dissolved in one of the above-mentioned solvents, and continuing the reaction until virtually no isocyanate can be detected in the reaction mixture.

A variant comprises using instead of a diisocyanate of formula (3) two or, if desired, more different diisocyanates and/or instead of a compound of formula (6) two or, if desired, more different compounds of formula (6) in the process, resulting in prepolymers comprising a mixture of several different symmetrical and asymmetrical compounds of formula (1), that is to say prepolymers in which the two R radicals, the two $R_1$ radicals and/or the two $R_3$ radicals in the molecule are identical or different.

The prepolymers obtained are isolated and purified according to methods known per se, for example extraction, crystallisation, recrystallisation, ultrafiltration or chromatographic purification methods. The compounds are obtained in high yields and a high degree of purity.

The prepolymers according to the invention are crosslinkable but are uncrosslinked or at least substantially uncrosslinked; they are furthermore stable, that is to say spontaneous crosslinking by homopolymerisation does not occur.

The crosslinkable prepolymers of formula (1) obtainable in accordance with the invention are advantageously liquid or readily meltable or water-soluble; preference is given especially to those prepolymers which are water-soluble. The average molecular weight of the prepolymers according to the invention may vary within wide limits. An average molecular weight of, for example, from 1000 to 50000 has proved advantageous for the prepolymers according to the invention.

The prepolymers according to the invention may furthermore be purified in a manner known per se, for example by precipitation with acetone, dialysis or ultrafiltration, ultrafiltration being especially preferred. By means of such a purification process the prepolymers according to the invention can be obtained in extremely pure form, for example in the form of solvent-free liquids or melts or in the form of concentrated aqueous solutions that are free or at least substantially free of reaction products, such as salts, and of starting materials or other non-polymeric constituents.

The preferred method of purifying the prepolymers according to the invention, ultrafiltration, may be carried out in a manner known per se. It is possible for the ultrafiltration to be carried out repeatedly, for example from two to ten times. The ultrafiltration may alternatively be carried out continuously until the desired degree of purity has been achieved. The desired degree of purity may, in principle, be as high as desired, and is preferably so selected that the content of undesired constituents in the prepolymer is, for example, $\leq 0.001\%$, especially $\leq 0.0001\%$ (1 ppm). The prepolymers may in addition, for example as a result of their synthesis, comprise constituents that are acceptable from the physiological point of view, for example sodium chloride, such constituents advantageously being present in an amount of $\leq 1\%$, especially $\leq 0.1\%$, or more especially $\leq 0.01\%$.

As has already been mentioned, the prepolymers according to the invention can be crosslinked extremely effectively and in a selective manner, especially by photo crosslinking. The crosslinking may be carried out in the presence or, preferably, in the absence of an additional vinyl comonomer. The crosslinked polymers are water-insoluble.

Suitably, a photoinitiator that is able to initiate free-radical crosslinking is added in the photo crosslinking process. Examples of photoinitiators are familiar to the person skilled in the art, but suitable photoinitiators that may be mentioned specifically are benzoin methyl ether, 1-hydroxycyclohexylphenylketone, Darocure 1173 and Irgacure types. The crosslinking may then be triggered by actinic radiation, such as, for example, UV light, or ionising radiation, such as, for example, gamma radiation or X-ray radiation.

The photopolymerisation may be carried out without the addition of a solvent, for example when the prepolymer is liquid or readily meltable, or is carried out in a suitable solvent. A suitable solvent is in principle any solvent that dissolves the polymers according to the invention and the vinyl comonomer that may be used in addition, for example water, an alcohol, such as a lower alkanol, for example ethanol or methanol, a carboxylic acid amide, such as dimethylformamide, or dimethyl sulfoxide, or also a mixture of suitable solvents, for example a mixture of water with an alcohol, for example a water/ethanol or water/methanol mixture.

The photocrosslinking is preferably carried out under solventless or substantially solventless conditions or directly from an aqueous solution of the prepolymer according to the invention which can be obtained as a result of the preferred purification step, ultrafiltration, optionally after the addition of an additional vinyl comonomer. For example the photocrosslinking of an approximately 15 to 90% aqueous solution may be carried out.

The process for the preparation of the crosslinked polymers according to the invention comprises, for example, photocrosslinking a prepolymer of formula (1) according to the invention, especially in substantially pure form, that is to say, for example, after single or repeated ultrafiltration, under solventless or substantially solventless conditions, or in solution, especially in aqueous solution, in the presence or, preferably, in the absence of an additional vinyl comonomer, preferably using a photoinitiator.

The vinyl comonomer that may, in accordance with the invention, be used in addition in the photocrosslinking may be hydrophilic or hydrophobic or may be a mixture of a hydrophobic and a hydrophilic vinyl monomer. Suitable vinyl monomers include especially those customarily used in the manufacture of contact lenses. A hydrophilic vinyl monomer is to be understood as meaning a monomer that typically yields as homopolymer a polymer that is water-soluble or is capable of absorbing at least 10% by weight of water. Analogously, a hydrophobic vinyl monomer is to be understood as meaning a monomer that typically yields as homopolymer a polymer that is water-insoluble and is capable of absorbing less than 10% by weight of water.

Preference is given to the use of a hydrophobic vinyl comonomer, or a mixture of a hydrophobic vinyl comonomer with a hydrophilic vinyl comonomer, the mixture comprising at least 50% by weight of a hydrophobic vinyl comonomer. It is possible in that manner for the mechanical properties of the polymer to be improved without the water content being appreciably reduced. In principle, however, both conventional hydrophobic vinyl comonomers and conventional hydrophilic vinyl comonomers are suitable for the copolymerisation with the prepolymers according to the invention.

Suitable hydrophobic vinyl comonomers include, without this list being exhaustive, $C_1$–$C_{18}$-alkyl acrylates and methacrylates, $C_3$–$C_{18}$alkyl acrylamides and methacrylamides, acrylonitrile, methacrylonitrile, vinyl-$C_1$–$C_{18}$alkanoates, $C_2$–$C_{18}$alkenes, $C_2$–$C_{18}$haloalkenes, styrene, $C_1$–$C_6$alkylstyrene, vinyl alkyl ethers in which the alkyl moiety has from 1 to 6 carbon atoms, $C_2$–$C_{10}$perfluoroalkyl acrylates and methacrylates or corresponding partially fluorinated acrylates and methacrylates, $C_3$–$C_{12}$perfluoroalkylethylthiocarbonylaminoethyl acrylates and methacrylates, acryloxy- and methacryloxy-alkylsiloxanes, N-vinylcarbazole, and $C_1$–$C_{12}$alkyl esters of maleic acid, fumaric acid, itaconic acid, mesaconic acid and the like. Preference is given, for example, to $C_1$–$C_4$alkyl esters of vinylically unsaturated carboxylic acids having from 3 to 5 carbon atoms and to vinyl esters of carboxylic acids having up to 5 carbon atoms.

Examples of suitable hydrophobic vinyl comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tris-trimethylsilyloxy-silylpropyl methacrylate, 3-methacryloxypropylpentamethyl disiloxane and bis (methacryloxypropyl)tetramethyl disiloxane.

Suitable hydrophilic vinyl comonomers include, without this list being exhaustive, hydroxy-substituted lower alkyl acrylates and methacrylates, acrylamide, methacrylamide, lower alkyl acrylamides and methacrylamides, ethoxylated acrylates and methacrylates, hydroxy-substituted lower alkyl acrylamides and methacrylamides, hydroxy-substituted lower alkyl vinyl ethers, sodium ethylenesulfonate, sodium styrenesulfonate, 2-acrylamido-2-methylpropanesulfonic acid, N-vinylpyrrole, N-vinylsuccinimide, N-vinylpyrrolidone, 2- or 4-vinylpyridine, acrylic acid, methacrylic acid, amino- (the term "amino" also including quaternary ammonium), mono-lower alkylamino- or di-lower alkylamino-lower alkyl acrylates and methacrylates, allyl alcohol and the like. Preference is given, for example, to hydroxy-substituted $C_2$–$C_4$alkyl (meth)acrylates, five- to seven-membered N-vinyl lactams, N,N-di-$C_1$–$C_4$alkyl (meth)acrylamides and vinylically unsaturated carboxylic acids having a total of from 3 to 5 carbon atoms.

Examples of suitable hydrophilic vinyl comonomers include hydroxyethyl methacrylate, hydroxyethyl acrylate, acrylamide, methacrylamide, dimethyl acrylamide, allyl alcohol, vinylpyridine, vinylpyrrolidone, glycerol methacrylate, N-(1,1-dimethyl-3-oxobutyl)acrylamide, and the like.

Preferred hydrophobic vinyl comonomers are methyl methacrylate and vinyl acetate.

Preferred hydrophilic vinyl comonomers are 2-hydroxyethyl methacrylate, N-vinylpyrrolidone and acrylamide.

The processing of the prepolymers in accordance with the invention to form ophthalmic mouldings, especially contact lenses, may be carried out in a manner known per se, for example by carrying out the photocrosslinking of the prepolymers according to the invention in a suitable contact lens mould. Further examples of mouldings according to the invention in addition to contact lenses are, for example, intraocular lenses and eye dressings, biomedical mouldings for use in surgery, such as heart valves, artificial arteries or the like, and also films or membranes, for example membranes for controlling diffusion, photostructurable foils for information storage, or photoresist materials, for example membranes or mouldings for etching resist or screen printing resist.

A preferred process for the production of mouldings comprises the following steps:
   a) introducing into a mould a prepolymer that is liquid at room temperature or readily meltable, corresponds essentially to formula (1) and is substantially free of solvents, in the presence or, preferably, in the absence of an additional vinyl comonomer and with the addition of a photoinitiator,
   b) initiating the photocrosslinking,
   c) opening the mould, so that the moulding can be removed from the mould.

A further preferred process for the production of mouldings comprises the following steps:
   a) preparing a substantially aqueous solution of a water-soluble prepolymer that corresponds essentially to formula (1), in the presence or, preferably, in the absence of an additional vinyl comonomer and with the addition of a photoinitiator,
   b) introducing the resulting solution into a mould,
   c) initiating the photocrosslinking,
   d) opening the mould, so that the moulding can be removed from the mould.

Processes that are known per se, such as especially conventional introduction by metering, especially by dropwise introduction, may be used to introduce the prepolymers according to the invention into a mould. Suitable vinyl comonomers, if present, are the aforementioned comonomers in the described amounts. The vinyl comonomers that may be present are advantageously first of all mixed with the prepolymer according to the invention and then introduced into the mould.

Appropriate moulds are produced, for example, from polypropylene. Suitable materials for reusable moulds are, for example, quartz, sapphire glass and metals.

If the mouldings to be produced are contact lenses, the mouldings can be produced in a manner known per se, for example in a conventional "spin-casting-mold", as described, for example, in U.S. Pat. No. 3,408,429, or in accordance with the so-called full-mold method in a static mould, as described, for example, in U.S. Pat. No. 4,347,198.

The photocrosslinking can be initiated in the mould, for example by actinic radiation, for example by UV light, or ionising radiation, for example gamma radiation or X-rays.

As has already been mentioned, the photocrosslinking is advantageously carried out in the presence of a photoinitiator that is capable of initiating free-radical crosslinking. The photoinitiator is added to the prepolymers according to the invention advantageously before introduction into the mould, preferably by mixing the polymers and the photoinitiator with one another. The amount of photoinitiator may be selected within wide limits, an amount of up to 0.05 g/g of polymer or especially of up to 0.003 g/g of polymer having proved favourable.

It should be emphasised that, according to the invention, the crosslinking can be effected in a very short time, for example in $\leq 60$ minutes, advantageously in $\leq 20$ minutes, especially in $\leq 10$ minutes, more especially in $\leq 5$ minutes, more especially in from 1 to 60 seconds or most especially in from 1 to 30 seconds.

The opening of the mould, so that the moulding can be removed from the mould, can be carried out in a manner known per se.

If the moulding produced in accordance with the invention is a contact lens, and if that lens has been produced under solventless conditions from a prepolymer according to the invention that has been purified beforehand, then it is usually unnecessary for the removal of the moulding to be followed by purification steps, such as, for example, extraction, because the prepolymers used do not contain any undesired low-molecular-weight constituents; consequently the crosslinked product is also free or substantially free of such constituents and subsequent extraction is unnecessary. The contact lens can accordingly be converted directly into a ready-to-use contact lens in customary manner by hydration. Suitable forms of hydration, by which ready-to-use contact lenses having a wide variety of water contents can be obtained, are known to the person skilled in the art. The contact lens is swelled, for example, in water, in an aqueous salt solution, especially in an aqueous salt solution having an osmolarity of approximately from 200 to 450 milliosmol per 1000 ml (unit: mosm/l), preferably of approximately from 250 to 350 mosm/l or especially of approximately 300 mosm/l, or in a mixture of water or of an aqueous salt solution with a physiologically tolerable polar urganic solvent, such as glycerol. The prepolymer is preferably swelled in water or in aan aqueous salt solution.

The aqueous salt solutions used for the hydration are advantageously solution s of physiologically tolerable salts, such as the buffer salts customary in the field of contact lens care, for example phosphate salts, or the isotonicising agents customary in the field of contact lens care, such as especially alkali metal halides, for example sodium chloride, or solutions of mixtures thereof. An example of an especially suitable salt solution is a synthetic, preferably buffered, lachrymal fluid that has been matched to natural lachrymal fluid in respect of pH value and osmolarity, for example an unbuffered or preferably buffered, for example phosphate buffer-buffered, sodium chloride solution the osmolarity and pH value of which correspond to the osmolarity and pH value of human lachrymal fluid.

The above-defined hydration liquids are preferably pure, that is to say free or substantially free of undesirable constituents. They are especially pure water or a synthetic lachrymal fluid as described above.

If the moulding produced in accordance with the invention is a contact lens, and if that lens has been produced from an aqueous solution of a prepolymer according to the invention that has been purified beforehand, then the crosslinked product also will not contain any troublesome impurities. Subsequent extraction is accordingly unnecessary. Since the crosslinking is carried out in a substantially aqueous solution, subsequent hydration is also unnecessary. According to an advantageous embodiment, the contact lenses obtainable by that process are hence distinguished by the fact that they are suitable for their intended use without extraction. "Intended use" in this context is to be understood as meaning especially that the contact lenses can be inserted into the human eye.

The contact lenses obtainable according to the invention have a wide range of unusual and extremely advantageous properties, amongst which mention should be made, for example, of their excellent tolerability by the human cornea, which is based on a balance of water content, oxygen permeability and mechanical properties. The contact lenses according to the invention also exhibit a high degree of dimensional stability. No changes in shape can be detected even after autoclaving at, for example, approximately 120° C.

Attention may also be drawn to the fact that the contact lenses according to the invention, that is to say especially those comprising a crosslinked polymer from a prepolymer of formula (1), can be produced in a very simple and efficient manner compared with the state of the art. This is as a result of several factors. First, the starting materials can be obtained or produced at low cost. Secondly, there is the advantage that the prepolymers are surprisingly stable, so that they can be subjected to a high degree of purification. It is therefore possible to use for the crosslinking a polymer that requires virtually no subsequent purification, such as especially the complicated extraction of unpolymerised constituents. In addition, the crosslinking may be carried out under solventless conditions or in aqueous solution, so that a subsequent exchange of solvent or hydration step is not necessary. Finally, the photopolymerisation is carried out within a short period of time, so that the process of producing the contact lenses according to the invention can be organised to be extraordinarily economical from that point of view also.

All of the above advantages naturally apply not only to contact lenses but also to other mouldings according to the invention. The total effect of the various advantageous aspects in the production of the mouldings according to the invention is that the mouldings according to the invention are suitable especially as mass-produced articles, such as, for example, contact lenses that are worn for a short length of time and are then replaced by new lenses.

In the following Examples amounts are amounts by weight, unless specified otherwise, and temperatures are given in degrees Celsius. The Examples are not intended to limit the invention in any way, for example to the scope of the Examples.

PREPARATION EXAMPLES

Example 1

4.44 g of isophorone diisocyanate are mixed with 0.026 g of dibutyltin dilaurate and the mixture is heated to 70° C. 17.58 g of polyethylene glycol 1500-diglycidyl diacrylate (reaction product of 1 molar equivalent of polyethylene glycol 1500-diglycidyl ether and 2 molar equivalents of acrylic acid) dissolved in 200 ml of toluene are added dropwise, and the mixture is stirred until the isocyanate content has been reduced to half (approximately 2.5 hours). 9.72 g of polyethylene glycol 400-monomethacrylate, dissolved in 100 ml of dioxane, are then added dropwise and stirring is continued at 70° C. until virtually no isocyanate can be detected (isocyanate content $\leq 0.01$ equivalently, approximately 12 hours). Finally, the solution is concentrated and the product is precipitated from diethyl ether.

Example 2

In accordance with the method indicated in Example 1, 4.44 g of isophorone diisocyanate are reacted with 17.58 g of polyethylene glycol 1500-diglycidyl diacrylate and 21.72 g of polyethylene glycol 1000-monomethacrylate.

Example 3

In accordance with the method indicated in Example 1, 8.89 g of isophorone diisocyanate are reacted with 45.12 g of polyethylene glycol 2000-diglycidyl diacrylate and 43.4 g of polyethylene glycol 1000-monomethacrylate.

Example 4

In accordance with the method indicated in Example 1, 7.11 g of isophorone diisocyanate are reacted with 18.3 g of polyethylene glycol 1000-diglycidyl diacrylate and 34.75 g of polyethylene glycol 1000-monomethacrylate.

APPLICATION EXAMPLES

Example 5

1.2 g of the prepolymer obtained according to Example 1 and 4 mg of Irgacure® 2959 are mixed with 0.8 g of water until a homogeneous clear solution is obtained. A 0.1 mm thick film is produced from the clear viscous solution between two glass plates provided with spacers. The film is irradiated for 10 seconds using a UV lamp. A clear flexible film is obtained which swells in water to form a clear hydrogel having a solids content of 40%. The elasticity modulus of the swelled film is 4.1 Mpa (measured using a tension measuring apparatus from the company Vitrodyne), and the elongation at tear has a value of from 50 to 100%.

Example 6

1.2 g of the prepolymer obtained according to Example 2 and 4 mg of Irgacure® 2959 are mixed with 0.8 g of water until a homogeneous clear solution is obtained. A 0.1 mm thick film is produced from the clear viscous solution between two glass plates provided with spacers. The film is exposed for 10 seconds using a UV lamp. A clear flexible film is obtained which swells in water to form a clear hydrogel having a solids content of 32%. The elasticity modulus of the swollen film is 2.6 Mpa (measured using a tension measuring apparatus from the company Vitrodyne), and the elongation at tear has a value of approximately 45%.

Example 7

1.2 g of the prepolymer obtained according to Example 3 and 4 mg of Irgacure® 2959 are mixed with 0.8 g of water until a homogeneous clear solution is obtained. A 0.1 mm thick film is produced from the clear viscous solution between two glass plates provided with spacers. The film is exposed for 10 seconds using a UV lamp. A clear flexible film is obtained which swells in water to form a clear hydrogel having a solids content of 26%. The elasticity modulus of the swollen film is 1.2 Mpa (measured using a tension measuring apparatus from the company Vitrodyne), and the elongation at tear has a value of approximately 40%.

Example 8

1 g of the prepolymer obtained according to Example 4 and 4 mg of Irgacure® 2959 are mixed with 1 g of water until a homogeneous clear solution is obtained. A 0.1 mm thick film is produced from the clear viscous solution between two glass plates provided with spacers. The film is exposed for 10 seconds using a UV lamp. A clear flexible film is obtained which swells in water to form a clear hydrogel having a solids content of 25%. The elasticity modulus of the swollen film is 1.4 Mpa (measured using a tension measuring apparatus from the company Vitrodyne), and the elongation at tear has a value of from 80 to 120%.

Example 9

4 mg of Irgacure® 2959 are dissolved in 1 g of the prepolymer obtained according to Example 4. A 0.1 mm thick film is produced from the clear viscous solution between two glass plates provided with spacers. The film is exposed for 10 seconds using a UV lamp. A clear flexible film is obtained which swells in water to form a clear hydrogel having a solids content of 47%.

What is claimed is:

1. An ophthalmic moulding, obtained by crosslinking a prepolymer that corresponds essentially to formula

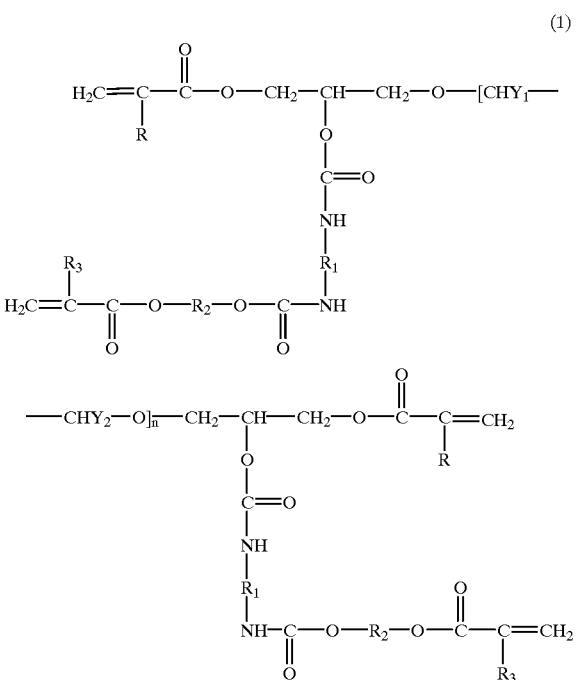

(1)

wherein

R and $R_3$ are each independently of the other hydrogen or methyl, one of the radicals $Y_1$ and $Y_2$ is hydrogen and the other is hydrogen or methyl, $R_1$ is the radical of a linear or branched aliphatic diisocyanate having from 3 to 24 carbon atoms, the radical of a cycloaliphatic or aliphatic-cycloaliphatic diisocyanate having from 3 to 24 carbon atoms, or the radical of an aromatic or araliphatic diisocyanate having from 6 to 24 carbon atoms, $R_2$ is a radical of formula

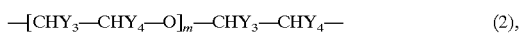

(2), wherein one of the radicals $Y_3$ and $Y_4$ is hydrogen and the other is hydrogen or methyl, m is an integer from 4 to 99 and n is an integer from 5 to 100, in the absence or presence of an additional vinyl comonomer.

2. An ophthalmic moulding according to claim 1 which is a contact lens.

3. An ophthalmic moulding according to claim 1 wherein $Y_1$ and $Y_2$ in formula (1) are each hydrogen.

4. An ophthalmic moulding according to claim 1 to 3, wherein $R_1$ is linear or branched $C_3$–$C_{18}$alkylene or unsubstituted or $C_1$–$C_4$alkyl- or $C_1$–$C_4$alkoxy-substituted $C_6$–$C_{10}$arylene, $C_7$–$C_{18}$aralkylene, $C_6$–$C_{10}$arylene-$C_1$–$C_2$alkylene-$C_6$–$C_{10}$arylene, $C_3$–$C_8$cycloalkylene, $C_3$–$C_8$cycloalkylene-$C_1$–$C_6$alkylene, $C_3$–$C_8$cycloalkyiene-$C_1$–$C_2$alkylene-$C_3$–$C_8$-cycloalkylene or $C_1$–$C_6$alkylene-$C_3$–$C_8$cycloalkylene-$C_1$–$C_6$alkylene.

5. An ophthalmic moulding according to claim 1, wherein $R_1$ is linear or branched $C_6$-$C_{10}$alkylene, cyclohexylenemethylene or cyclohexylenemethylenecyclohexylene unsubstituted or substituted in the cyclohexyl moiety by from 1 to 3 methyl groups, or phenylene or phenylenemethylenephenylene unsubstituted or substituted in the phenyl moiety by methyl.

6. An ophthalmic moulding according to claim 1, wherein $R_1$ is asymmetrical, branched $C_6$-$C_{10}$alkylene, or cyclohexylenemethylene substituted in the cyclohexyl moiety by from 1 to 3 methyl groups.

7. An ophthalmic moulding according to claim 1 wherein $R_3$ and $R_4$ are each hydrogen.

8. An ophthalmic moulding according to claim 1, wherein the prepolymer corresponds essentially to formula the cyclohexyl moiety by from 1 to 3 methyl groups, $Y_1$, $Y_2$, $Y_3$ and $Y_4$ are each hydrogen, and n and p are each independently of the other an integer from 9 to 25.

11. An ophthalmic moulding according to claim 1, wherein the crosslinking of the prepolymer takes place in the absence of an additional vinyl comonomer.

12. An ophthalmic moulding according to claim 1, wherein the prepolymer in substantially pure form is photocrosslinked in aqueous solution in the absence of an additional vinyl comonomer using a photoinitiator.

13. A process for the preparation of a prepolymer of formula (1) according to claim 1, wherein approximately 1 molar equivalent of a compound of formula

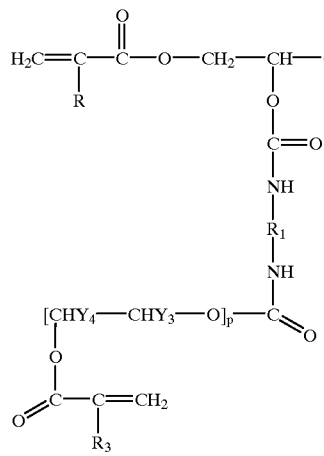

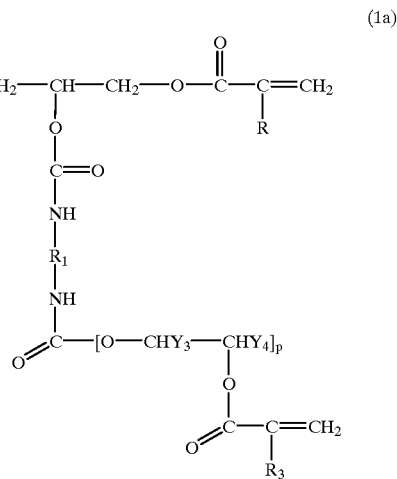

(1a)

wherein R, $R_1$, $R_3$, $Y_1$, $Y_2$, $Y_3$, $Y_4$ and n are each as defined in claim 1, and p is an integer from 5 to 100.

9. An ophthalmic moulding according to claim 8, wherein R and $R_3$ are each independently of the other hydrogen or methyl, $R_1$ is linear or branched $C_6$-$C_{10}$alkylene, cyclohexylene-methylene or cyclohexylenemethylenecyclohexylene unsubstituted or substituted in the cyclohexyl moiety from from 1 to 3 methyl groups, or phenylene or

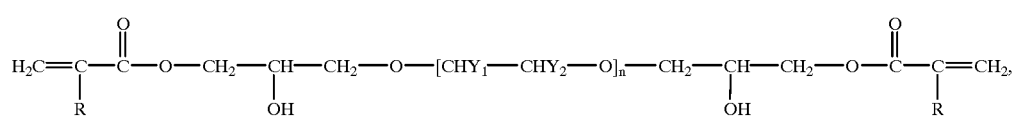

(3)

phenylenemethylene-phenylene unsubstituted or substituted in the phenyl moiety by methyl, $Y_1$, $Y_2$, $Y_3$ and $Y_4$ are each hydrogen, and n and p are each independently of the other an integer from 8 to 50.

10. An ophthalmic moulding according to claim 8, wherein R and $R_3$ are each independently of the other hydrogen or methyl, $R_1$ is asymmetrical, branched $C_6$-$C_{10}$alkylene, or cyclohexylenemethylene substituted in wherein R, $Y_1$, $Y_2$ and n are each as defined in claim 1, is reacted with approximately 2 molar equivalents of a diisocyanate of formula

(4)

wherein $R_1$ is as defined in claim 1, and the addition product of formula

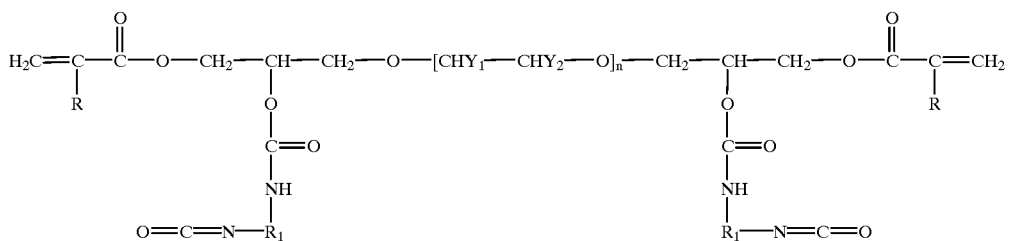

(5)

obtained in that process is then reacted with approximately 2 molar equivalents of a compound of formula

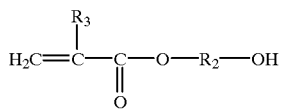

(6)

wherein $R_2$ and $R_3$ are each as defined in claim 1, to form a prepolymer of formula (1) according to the invention.

14. A process for the production of a moulding, which comprises the following steps:
   a) introducing into a mould a prepolymer of formula (1) according to claim 1 that is liquid at room temperature or melted and is substantially free of solvents, in the absence or presence of an additional vinyl comonomer and with the addition of a photoinitiator,
   b) initiating the photocrosslinking,
   c) opening the mould, so that the moulding can be removed from the mould.

15. A process according to claim 14, wherein the process is carried out in the absence of an additional vinyl comonomer.

16. A process according to claim 14, wherein the moulding is a contact lens.

17. A moulding, produced in accordance with the process according to claim 14.

18. A moulding according to claim 17, which is a contact lens and is suitable for its intended use without extraction.

19. A process for the production of mouldings, which comprises the following steps:
   a) preparing a substantially aqueous solution of a water-soluble prepolymer of formula (1) according to claim 1 in the absence or presence of an additional vinyl comonomer and with the addition of a photoinitiator,
   b) introducing the resulting solution into a mould,
   c) initiating the photocrosslinking,
   d) opening the mould, so that the moulding can be removed from the mould.

20. A process according to claim 19 carried out in the absence of an additional vinyl comonomer.

21. A prepolymer, which corresponds essentially to formula (1a) given in claim 8.

22. A prepolymer according to claim 21, wherein R and $R_3$ are each independently of the other hydrogen or methyl, $R_1$ is linear or branched $C_6$–$C_{10}$alkylene, cyclohexylenemethylene or cyclohexylenemethylenecyclohexylene unsubstituted or substituted in the cyclohexyl moiety by from 1 to 3 methyl groups, or phenylene or phenylenemethylenephenylene unsubstituted or substituted in the phenyl moiety by methyl, $Y_1$, $Y_2$, $Y_3$ and $Y_4$ are each hydrogen and n and p are each independently of the other an integer from 8 to 50.

23. A prepolymer according to claim 21, wherein R and $R_3$ are each independently of the other hydrogen or methyl, $R_1$ is asymmetrical, branched $C_6$–$C_{10}$alkylene, or cyclohexylene-methylene substituted in the cyclohexyl moiety by from 1 to 3 methyl groups, $Y_1$, $Y_2$, $Y_3$ and $Y_4$ are each hydrogen and n and p are each independently of the other an integer from 9 to 25.

24. A polymer, produced by crosslinking a prepolymer according to claim 21 in the absence or presence of an additional vinyl comonomer.

* * * * *